United States Patent
Tojo

[11] 4,279,477
[45] Jul. 21, 1981

[54] OBJECTIVE LENS SYSTEM FOR MICROSCOPES

[75] Inventor: Tsutomu Tojo, Nagano, Japan

[73] Assignee: Olympus Optical Co., Ltd., Tokyo, Japan

[21] Appl. No.: 101,188

[22] Filed: Dec. 7, 1979

[30] Foreign Application Priority Data

Dec. 11, 1978 [JP] Japan ............................... 53/153296

[51] Int. Cl.³ .......................... G02B 9/34; G02B 21/02
[52] U.S. Cl. ...................................... 350/414; 350/469
[58] Field of Search ......................... 350/175 ML, 220

[56] References Cited
U.S. PATENT DOCUMENTS

4,174,151 11/1979 Yonekubo ..................... 350/175 ML

*Primary Examiner*—John K. Corbin
*Assistant Examiner*—Scott J. Sugarman
*Attorney, Agent, or Firm*—Cushman, Darby & Cushman

[57] ABSTRACT

An objective lens system for microscopes comprising a front lens group consisting of a first positive meniscus lens component and a second positive cemented doublet component, and a rear lens group consisting of a third lens component having positive refractive power and a fourth lens component having positive refractive power, said objective lens system having a sufficiently large NA and being made of a glass material showing high transmittance for rays at short wavelengths.

14 Claims, 10 Drawing Figures

OBJECTIVE LENS SYSTEM FOR MICROSCOPES

BACKGROUND OF THE INVENTION (a) Field of the Invention

The present invention relates to an objective lens system for microscopes, and more specifically to an objective lens system for incident light fluorescence microscopes.

(b) Description of the Prior Art

Conventionally, there have been no objective lens systems designed especially for fluorescence microscopes, and ordinary type of objective lens systems having relatively high transmittance for excitation light (mainly ultraviolet rays) were selected for fluorescence microscopy. However, ordinary type objective lens systems designed for mgnification levels on the order of 10× have numerical aperture (NA) of 0.2 to 0.25 and, even when they show relatively high transmittance for excitation light, it is not high enough for fluorescence microscopy. In such objective lens systems, excitation light is attenuated rather remarkably before reaching a specimen as compared with intensity of incident light. Further, since fluorescence emitted from a specimen is very weak, objective lens systems having small NA remarkably darken images observed through fluorescence microscopes. In order to eliminate these defects, it is required to design an objective lens system which shows high transmittance for excitation light and has a large NA. Moreover, an objective lens system having a large NA is preferable for enhancing resolution even for purposes other than fluorescence microscopy.

SUMMARY OF THE INVENTION

A general object of the present invention is to provide an objective lens system for microscopes which has a large NA and is made of a glass material showing high transmittance even at short wavelengths so as to be usable for fluorescence microscopy.

The objective lens system according to the present invention comprises a front lens group consisting of a first positive meniscus lens component and a second positive cemented doublet, and a rear lens group consisting of a third positive single-element lens component or positive cemented doublet and a fourth positive single-element lens component or cemented doublet, and said objective lens system satisfying the conditions enumerated below:

$$0.5 < r_1/r_2 < 0.8 \quad (1)$$

$$0.3 < r_5/R < 1.1 \quad (2)$$

$$0.12f < d_1/n_1 < 0.19f \quad (3)$$

$$30 < [(\nu_3 - \nu_2) + (\nu_p - \nu_n)] < 120 \quad (4)$$

$$0.35 < f_1/f_2 < 0.65 \quad (5)$$

wherein the reference symbols are defined as follows:
$r_1$ and $r_2$: radii of curvature on both the surfaces of the first lens component
$r_5$: radius of curvature on the image side surface of the second lens component
$R$: radius of curvature on the image side surface of the third lens component
$d_1$: thickness of the first lens component
$n_1$: refractive index of the first lens component
$\nu_2$ and $\nu_3$: Abbe's numbers of both the elements respectively of the second lens component
$\nu_p$ and $\nu_n$: Abbe's numbers of the positive and negative lens element respectively of the cemented doublet arranged in the rear lens group
$f_1$ and $f_2$: focal lengths of the front lens group and rear lens group respectively.

Now, the significance of the afore-mentioned conditions will be described. The condition (1) defines, in combination with the condition (3), paraxial aberration or spherical aberration as well as offaxial aberrations or astigmatic difference and coma.

If $r_1/r_2$ is larger than the upper limit of the condition (1), spherical aberration and curvature of field will be undercorrected, whereas coma as spherical aberration produced by oblique rays (offaxial spherical aberration produced) will be overcorrected. If $r_1/r_2$ is smaller than the lower limit of the condition (1), in contrast, spherical aberration and curvature of field will be overcorrected, whereas coma will be undercorrected.

The condition (2) defines spherical aberration and coma. If $r_5/R$ exceeds the upper limit of the condition (2), spherical aberration will be overcorrected and asymmetrical inward coma will be aggravated. If $r_5/R$ is smaller than the lower limit of the condition (2), in contrast, spherical aberration will be undercorrected and asymmetrical outward coma will be aggravated.

The condition (3) serves, in combination with the above-described condition (1), for correcting spherical aberration and coma. If $d_1/n_1$ is larger than the upper limit of the condition (3), the optical tube length will be prolonged. If it is attempted to correct too long an optical tube length, spherical aberration will be undercorrected and Petzval's sum will be increased, thereby degrading flatness of the image plane. In addition, inward coma will be aggravated and the working distance will be shortened, thereby causing inconvenience for operation of the objective lens system. If $d_1/n_1$ is smaller than the lower limit of the condition (3), the optical tube length will be shortened. When it is attempted to correct it, spherical aberration will be overcorrected. In addition, though Petzval's sum is minimized, coma, especially outward coma will be increased, thereby making it impossible to maintain adequate balance.

The condition (4) is necessary for adequately balancing the functions achromatic lens components between the front and rear lens groups, and defines overall difference in dispersive power so as to obtain adequate balance between longitudinal chromatic aberration and lateral chromatic aberration throughout the entire lens system. If $(\nu_3 - \nu_2) + (\nu_p - \nu_n)$ is larger than the upper limit of the condition (4), sufficient correction of lateral chromatic aberration will result in overcorrection of longitudinal chromatic aberration which is produced by marginal rays having short wavelengths. If $(\nu_3 - \nu_2) + (\nu_p - \nu_n)$ is smaller than the lower limit of the condition (4), sufficient correction of longitudinal chromatic aberration will cause remarkable undercorrection of lateral chromatic aberration.

The condition (5) defines power balance between the front and rear lens groups as a factor important in determining lens composition. If $f_1/f_2$ is larger than the upper limit of the condition (5), the rear lens group will have power strong enough to make spherical aberration undercorrected, curvature of field overcorrected and coma remarkably asymmetrical. If $f_1/f_2$ is smaller than the lower limit of the condition (5), in contrast, the front lens group will have power strong enough to make it very difficult to correct spherical aberration. In other words, residual chromatic aberration will be remarkable and chromatic aberration of spherical aberration will hardly be correctable.

In addition to the conditions described above, the following condition (6) should desirably be satisfied to design a more preferable objective lens system.

$$0.075 < \left| \frac{N_n - N_p}{R'} \right| f < 0.25 \quad (6)$$

wherein the reference symbols $N_n$ and $N_p$ represent refractive indices of the negative and positive lens elements respectively of the cemented doublet arranged in the rear lens group, the reference symbol $R'$ designates radius of curvature on the cemented surface of the cemented doublet arranged in the rear lens group and the reference symbol $f$ denotes focal length of the lens system, as a whole.

The afore-mentioned condition (6) is additionally required for correcting spherical aberration, chromatic aberration and curvature of field. If $$\left| \frac{N_n - N_p}{R'} \right| f$$

is larger than the upper limit of the condition (6), spherical aberration will be overcorrected and curvature of field will be aggravated. If $$\left| \frac{N_n - N_p}{R'} \right| f$$

is smaller than the lower limit of the condition (6), in contrast, spherical aberration will be undercorrected and it will be very difficult to correct chromatic aberration.

DESCRIPTION OF THE PREFERRED EMBODIMENTS

Now, numerical data for the above-described objective lens system will be set forth as preferred embodiments of the present invention:

Embodiment 1

$r_1 = -0.2293$
$r_2 = -0.3664$
$r_3 = 4.3251$
$r_4 = 0.5891$
$r_5 = -0.4488$
$r_6 = -3.6847$
$r_7 = -1.0139$
$r_8 = 2.3172$
$r_9 = 0.8443$
$r_{10} = -4.5056$ $d_1 = 0.2399$, $n_1 = 1.61659$, $\nu_1 = 36.63$
$d_2 = 0.0051$
$d_3 = 0.0436$, $n_2 = 1.57957$, $\nu_2 = 53.75$
$d_4 = 0.1894$, $n_3 = 1.43389$, $\nu_3 = 95.15$
$d_5 = 1.2629$
$d_6 = 0.1768$, $n_4 = 1.48749$, $\nu_4 = 70.15$
$d_7 = 0.0316$
$d_8 = 0.1086$, $n_5 = 1.61659$, $\nu_5 = 36.63$
$d_9 = 0.1894$, $n_6 = 1.43389$, $\nu_6 = 95.15$
$f = 1$, $NA = 0.4$, $\beta = -10X$
$f_1 = 1.08$, $f_2 = 1.99$ Embodiment 2

$r_1 = -0.2459$
$r_2 = -0.3818$
$r_3 = 4.4832$
$r_4 = 0.5852$
$r_5 = -0.4491$
$r_6 = -4.9133$
$r_7 = -1.0536$
$r_8 = 2.2089$
$r_9 = 0.8289$
$r_{10} = -6.2556$ $d_1 = 0.2396$, $n_1 = 1.61659$, $\nu_1 = 36.63$
$d_2 = 0.0050$
$d_3 = 0.0435$, $n_2 = 1.57957$, $\nu_2 = 53.75$
$d_4 = 0.2144$, $n_3 = 1.43389$, $\nu_3 = 95.15$
$d_5 = 1.2610$
$d_6 = 0.1765$, $n_4 = 1.48749$, $\nu_4 = 70.15$
$d_7 = 0.0315$
$d_8 = 0.1084$, $n_5 = 1.61659$, $\nu_5 = 36.63$
$d_9 = 0.1892$, $n_6 = 1.43389$, $\nu_6 = 95.15$
$f = 1$, $NA = 0.4$, $\beta = -10X$
$f_1 = 1.07$, $f_2 = 2.00$ Embodiment 3

$r_1 = -0.2168$
$r_2 = -0.3313$
$r_3 = 5.2569$
$r_4 = 0.5343$
$r_5 = -0.3793$
$r_6 = -49.8194$
$r_7 = -1.1560$
$r_8 = 2.5250$
$r_9 = 0.7026$
$r_{10} = 25.0452$ $d_1 = 0.2333$, $n_1 = 1.61659$, $\nu_1 = 36.63$
$d_2 = 0.0048$
$d_3 = 0.0418$, $n_2 = 1.57957$, $\nu_2 = 53.75$
$d_4 = 0.1818$, $n_3 = 1.43389$, $\nu_3 = 95.15$
$d_5 = 1.5147$
$d_6 = 0.1696$, $n_4 = 1.48749$, $\nu_4 = 70.15$
$d_7 = 0.0303$
$d_8 = 0.1042$, $n_5 = 1.61659$, $\nu_5 = 36.63$
$d_9 = 0.1818$, $n_6 = 1.48749$, $\nu_6 = 70.15$
$f = 1$, $NA = 0.4$, $\beta = -10X$
$f_1 = 0.811$, $f_2 = 2.16$ Embodiment 4

$r_1 = -0.2095$
$r_2 = 0.3158$
$r_3 = 5.0101$
$r_4 = 0.7297$
$r_5 = -0.4680$ $d_1 = 0.2372$, $n_1 = 1.61659$, $\nu_1 = 36.63$
$d_2 = 0.0050$
$d_3 = 0.0431$, $n_2 = 1.61659$, $\nu_2 = 36.63$
$d_4 = 0.2122$, $n_3 = 1.43389$, $\nu_3 = 95.15$
$d_5 = 1.2482$

-continued

Embodiment 4

| | | | |
|---|---|---|---|
| $r_6 = -3.3554$ | | | |
| | $d_6 = 0.1747$ | $n_4 = 1.48749$ | $\nu_4 = 70.15$ |
| $r_7 = -1.1513$ | | | |
| | $d_7 = 0.0312$ | | |
| $r_8 = 7.9857$ | | | |
| | $d_8 = 0.1073$ | $n_5 = 1.58921$ | $\nu_5 = 41.08$ |
| $r_9 = 1.0061$ | | | |
| | $d_9 = 0.1872$ | $n_6 = 1.43389$ | $\nu_6 = 95.15$ |
| $r_{10} = -1.5490$ | | | |
| | $f = 1$ | $NA = 0.4$ | $\beta = -10X$ |
| | $f_1 = 0.96$ | $f_2 = 2.10$ | |

Embodiment 5

| | | | |
|---|---|---|---|
| $r_1 = -0.2065$ | | | |
| | $d_1 = 0.2551$ | $n_1 = 1.61659$ | $\nu_1 = 36.63$ |
| $r_2 = -0.3465$ | | | |
| | $d_2 = 0.0050$ | | |
| $r_3 = -5.6243$ | | | |
| | $d_3 = 0.0429$ | $n_2 = 1.61659$ | $\nu_2 = 36.63$ |
| $r_4 = 0.3834$ | | | |
| | $d_4 = 0.2115$ | $n_3 = 1.61117$ | $\nu_3 = 55.92$ |
| $r_5 = -0.5668$ | | | |
| | $d_5 = 1.2442$ | | |
| $r_6 = -2.1238$ | | | |
| | $d_6 = 0.1070$ | $n_4 = 1.61659$ | $\nu_4 = 36.63$ |
| $r_7 = 1.4540$ | | | |
| | $d_7 = 0.1860$ | $n_5 = 1.48749$ | $\nu_5 = 70.15$ |
| $r_8 = -1.0154$ | | | |
| | $d_8 = 0.0305$ | | |
| $r_9 = 4.9207$ | | | |
| | $d_9 = 0.1742$ | $n_6 = 1.48749$ | $\nu_6 = 70.15$ |
| $r_{10} = -2.2830$ | | | |
| | $f = 1$ | $NA = 0.4$ | $\beta = -10X$ |
| | $f_1 = 0.884$ | $f_2 = 2.18$ | |

Embodiment 6

| | | | |
|---|---|---|---|
| $r_1 = -0.2179$ | | | |
| | $d_1 = 0.2515$ | $n_1 = 1.51633$ | $\nu_1 = 64.15$ |
| $r_2 = -0.3026$ | | | |
| | $d_2 = 0.0062$ | | |
| $r_3 = 3.1358$ | | | |
| | $d_3 = 0.0418$ | $n_2 = 1.71700$ | $\nu_2 = 47.94$ |
| $r_4 = 0.8726$ | | | |
| | $d_4 = 0.1107$ | $n_3 = 1.61720$ | $\nu_3 = 54.04$ |
| $r_5 = -0.9623$ | | | |
| | $d_5 = 1.1266$ | | |
| $r_6 = -3.3947$ | | | |
| | $d_6 = 0.1052$ | $n_4 = 1.64769$ | $\nu_4 = 33.80$ |
| $r_7 = 1.5258$ | | | |
| | $d_7 = 0.1365$ | $n_5 = 1.49831$ | $\nu_5 = 65.03$ |
| $r_8 = -0.9225$ | | | |
| | $d_8 = 0.0307$ | | |
| $r_9 = 3.6194$ | | | |
| | $d_9 = 0.2460$ | $n_6 = 1.58528$ | $\nu_6 = 50.87$ |
| $r_{10} = -4.4582$ | | | |
| | $f = 1$ | $NA = 0.4$ | $\beta = -10X$ |
| | $f_1 = 0.95$ | $f_2 = 1.77$ | |

Embodiment 7

| | | | |
|---|---|---|---|
| $r_1 = -0.2689$ | | | |
| | $d_1 = 0.2473$ | $n_1 = 1.61659$ | $\nu_1 = 36.63$ |
| $r_2 = -0.4551$ | | | |
| | $d_2 = 0.0060$ | | |
| $r_3 = 3.2970$ | | | |
| | $d_3 = 0.0423$ | $n_2 = 1.61659$ | $\nu_2 = 36.63$ |
| $r_4 = 0.5488$ | | | |
| | $d_4 = 0.1149$ | $n_3 = 1.55963$ | $\nu_3 = 61.14$ |
| $r_5 = -0.5173$ | | | |
| | $d_5 = 1.1075$ | | |
| $r_6 = -2.4841$ | | | |
| | $d_6 = 0.1034$ | $n_4 = 1.61659$ | $\nu_4 = 36.63$ |
| $r_7 = 1.2691$ | | | |
| | $d_7 = 0.1632$ | $n_5 = 1.48749$ | $\nu_5 = 70.15$ |
| $r_8 = -1.0786$ | | | |
| | $d_8 = 0.0302$ | | |
| $r_9 = 2.8706$ | | | |
| | $d_9 = 0.1693$ | $n_6 = 1.51728$ | $\nu_6 = 69.56$ |
| $r_{10} = -2.2526$ | | | |
| | $f = 1$ | $NA = 0.4$ | $\beta = -10X$ |
| | $f_1 = 0.88$ | $f_2 = 1.84$ | |

Embodiment 8

| | | | |
|---|---|---|---|
| $r_1 = -0.1962$ | | | |
| | $d_1 = 0.2510$ | $n_1 = 1.56873$ | $\nu_1 = 63.16$ |
| $r_2 = -0.3065$ | | | |
| | $d_2 = 0.0061$ | | |
| $r_3 = 1.8758$ | | | |
| | $d_3 = 0.0417$ | $n_2 = 1.71700$ | $\nu_2 = 47.94$ |
| $r_4 = 0.6175$ | | | |
| | $d_4 = 0.1105$ | $n_3 = 1.61342$ | $\nu_3 = 57.41$ |
| $r_5 = -0.9062$ | | | |
| | $d_5 = 1.1243$ | | |
| $r_6 = -2.4746$ | | | |
| | $d_6 = 0.1049$ | $n_4 = 1.64769$ | $\nu_4 = 33.80$ |
| $r_7 = 1.3788$ | | | |
| | $d_7 = 0.1362$ | $n_5 = 1.48749$ | $\nu_5 = 70.15$ |
| $r_8 = -1.1274$ | | | |
| | $d_8 = 0.0307$ | | |
| $r_9 = 5.4990$ | | | |
| | $d_9 = 0.2455$ | $n_6 = 1.51728$ | $\nu_6 = 69.56$ |
| $r_{10} = -1.4729$ | | | |
| | $f = 1$ | $NA = 0.4$ | $\beta = -10X$ |
| | $f_1 = 0.90$ | $f_2 = 1.88$ | | wherein the reference symbols $r_1$ through $r_{10}$ represents radii of curvature on the surfaces of the respective lens elements, the reference symbols $d_1$ through $d_6$ designate thicknesses of the respective lens elements and airspace reserved therebetween, the reference symbols $n_1$ through $n_6$ denote refractive indices of the respective lens elements and the reference symbols $\nu_1$ through $\nu_6$ represent Abbe's numbers of the respective lens elements.

Figure 1:
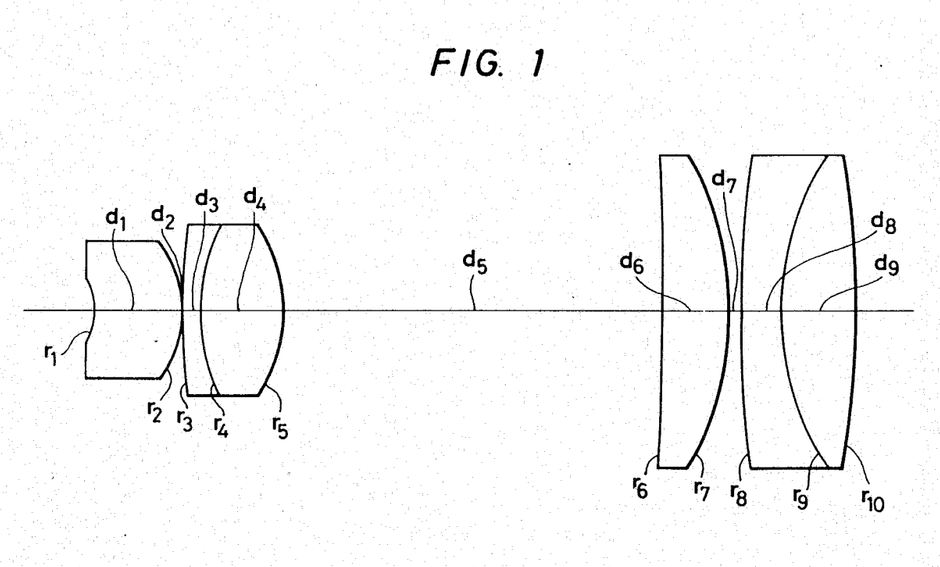
FIG. 1 shows a sectional view illustrating the composition of the objective lens systems preferred as embodiments 1 through 4 of the present invention.

Out of the eight embodiments described above, embodiments 1 through 4 comprise a single-element lens and a positive cemented doublet which are used as the third and fourth lens components respectively in the rear lens group, as illustrated in FIG. 1. In these embodiments, the reference symbol R therefore corresponds to $r_7$, the reference symbols $N_n$ and $N_p$ correspond to $n_5$ and $n_6$ respectively, the reference symbols $\nu_n$ and $\nu_p$ correspond to $\nu_5$ and $\nu_6$ respectively, and the reference symbols R' corresponds to $r_9$. In case of these embodiments, it is possible to obtain a especially favorable lens system by modifying the upper and lower limits of the conditions (2), (4) and (6) into those defined by the following conditions (2'), (4') and (6') respectively:

$$0.3 < r_5/R < 0.5 \tag{2'}$$

$$70 < [\nu_3 - \nu_2) + (\nu_p - \nu_n)] < 120 \tag{4'}$$

$$0.13 < |(N_n - N_p)/R'| f < 0.25 \tag{6'}$$

Figure 2:
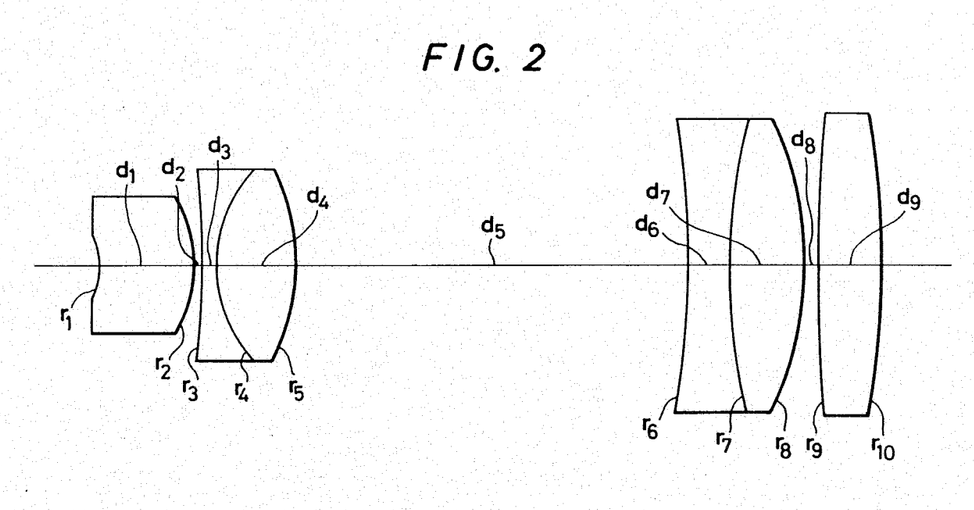
FIG. 2 shows a sectional view illustrating the composition of the objective lens systems preferred as embodiments 5 through 8; and FIG. 3 through FIG. 10 shows curves illustrating the aberration characteristics of the embodiments 1 through 8.
Figure 3:
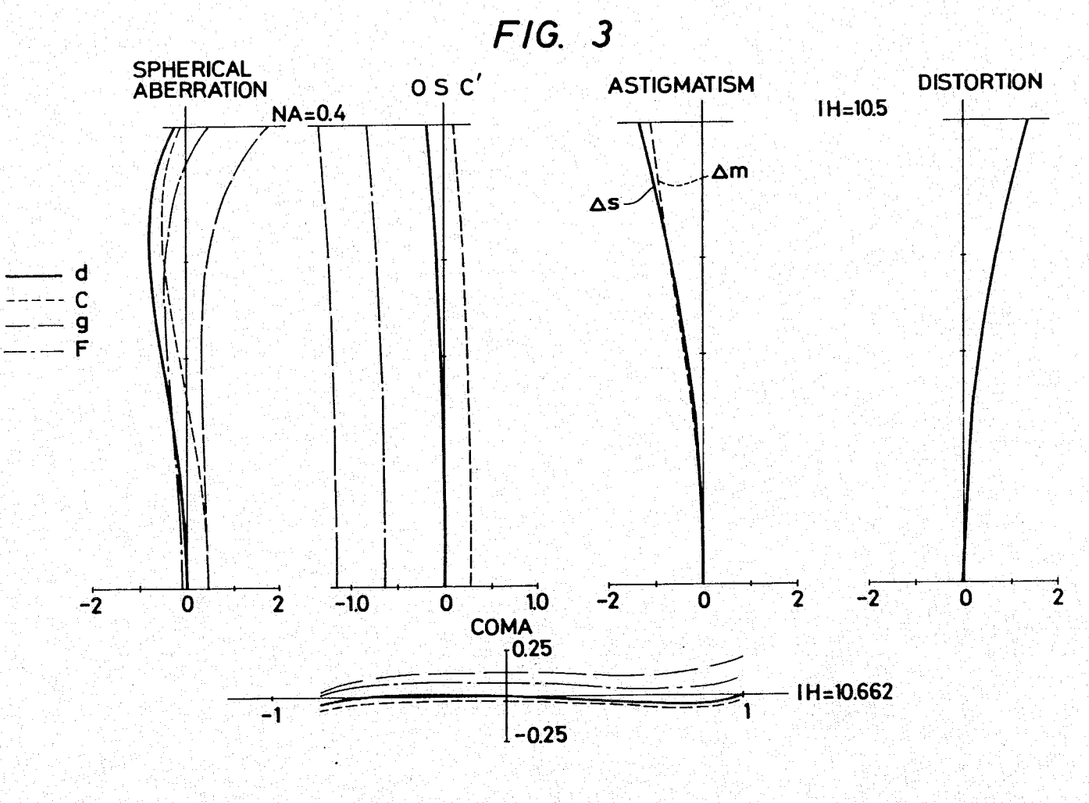
Figure 4:
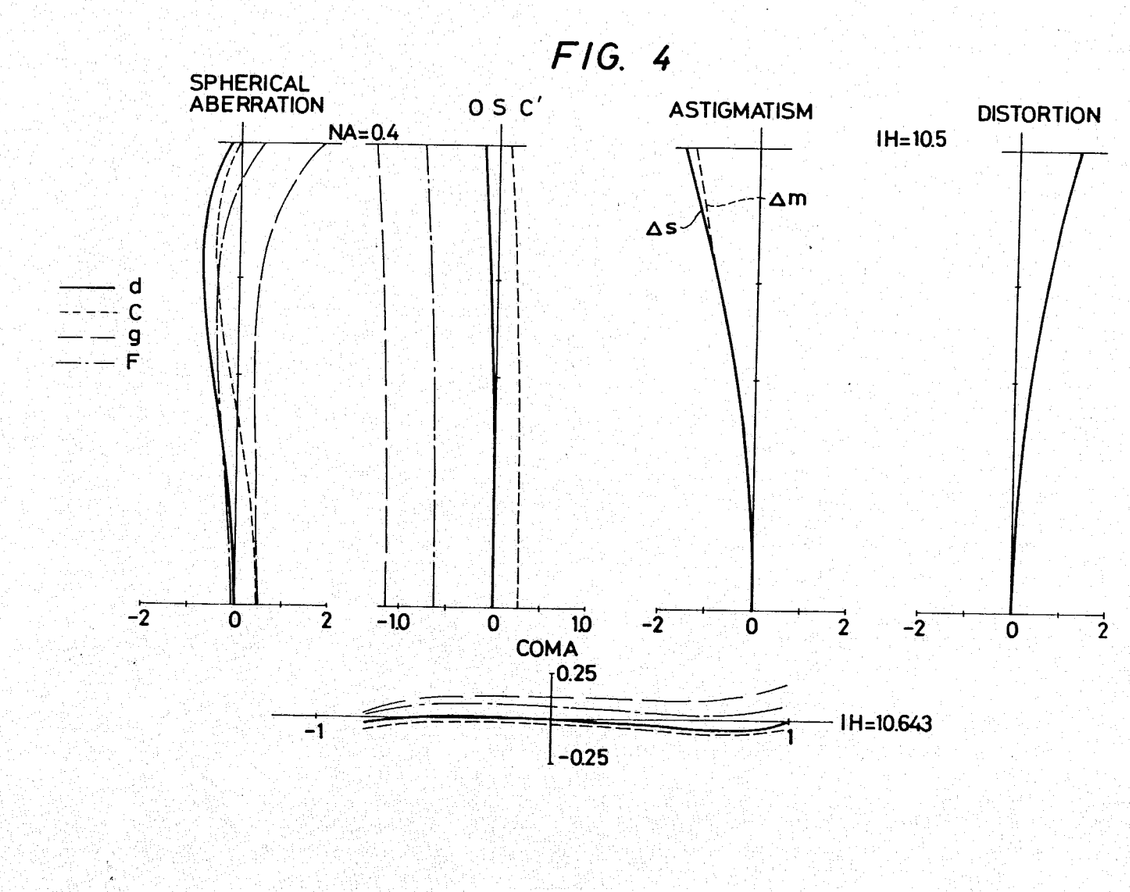
Figure 5:
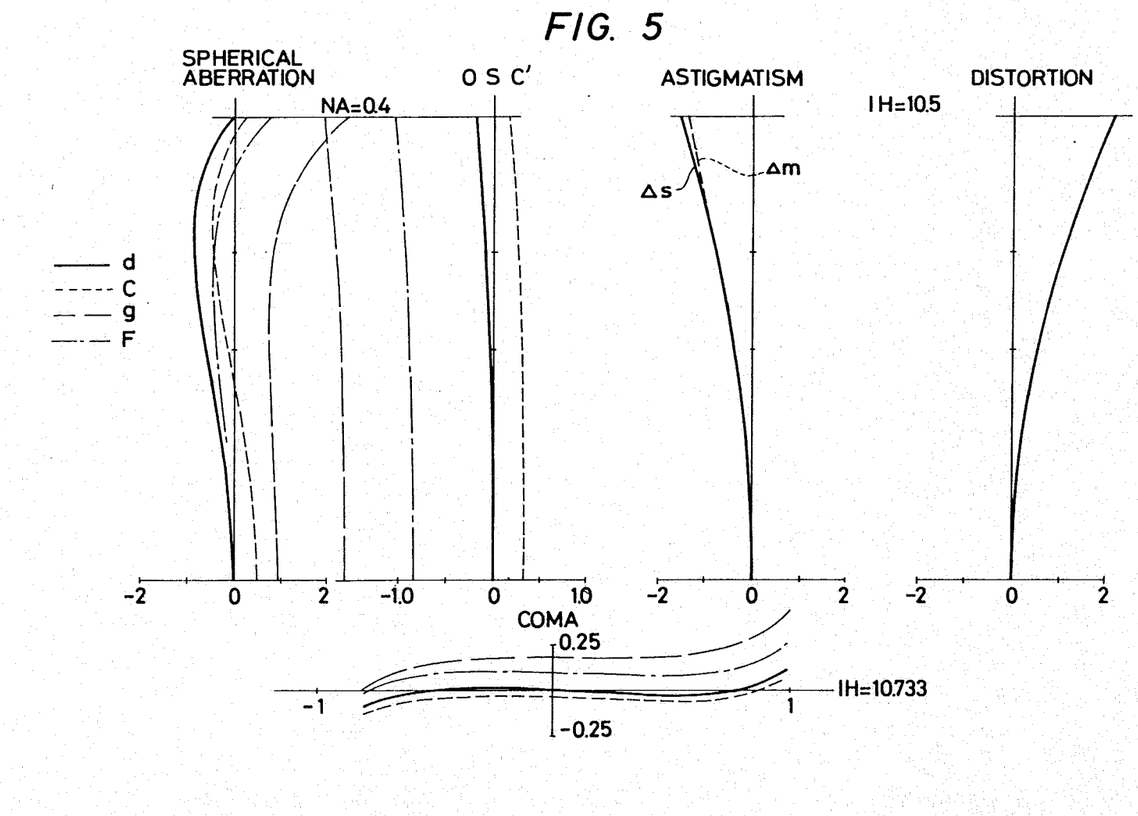
Figure 6:
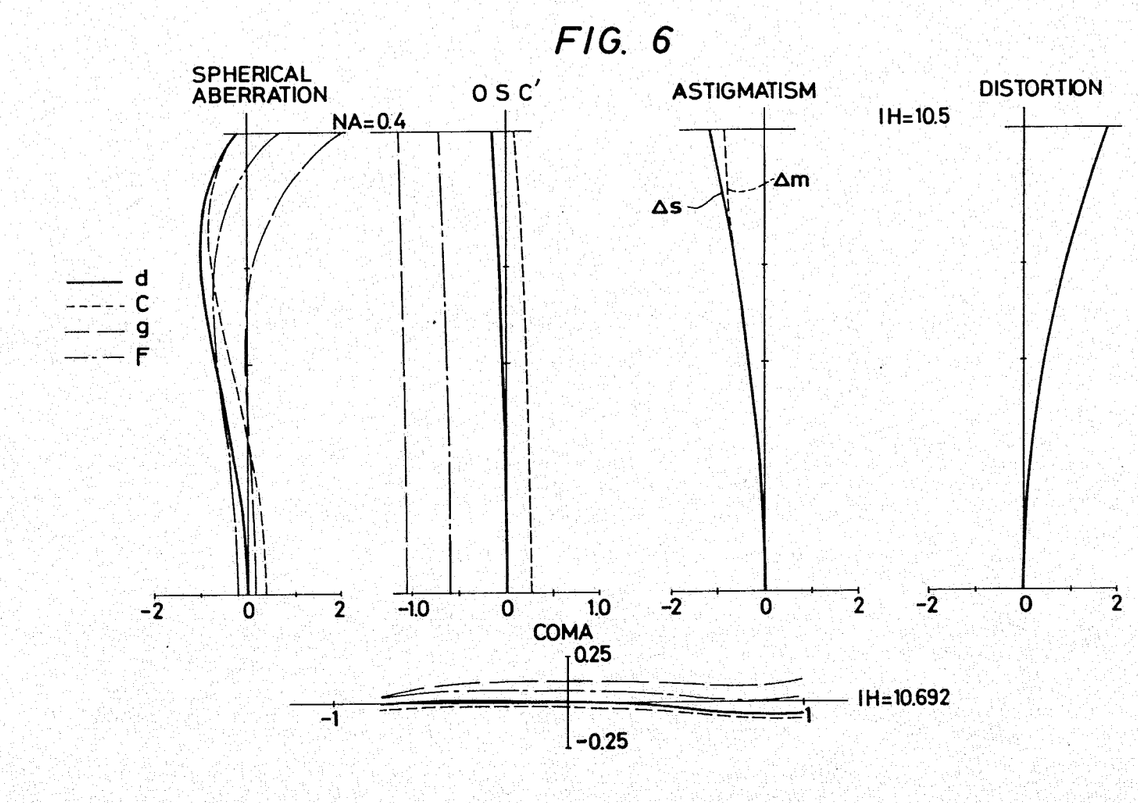
Figure 7:
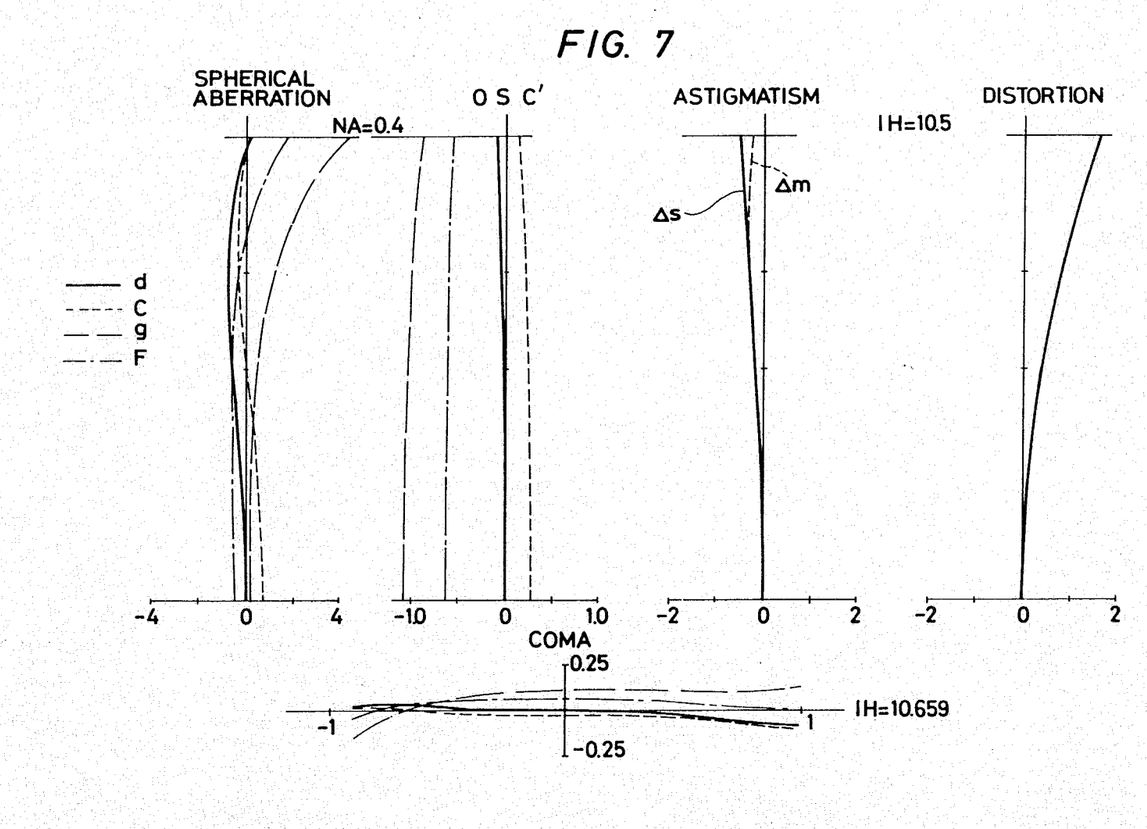
Figure 8:
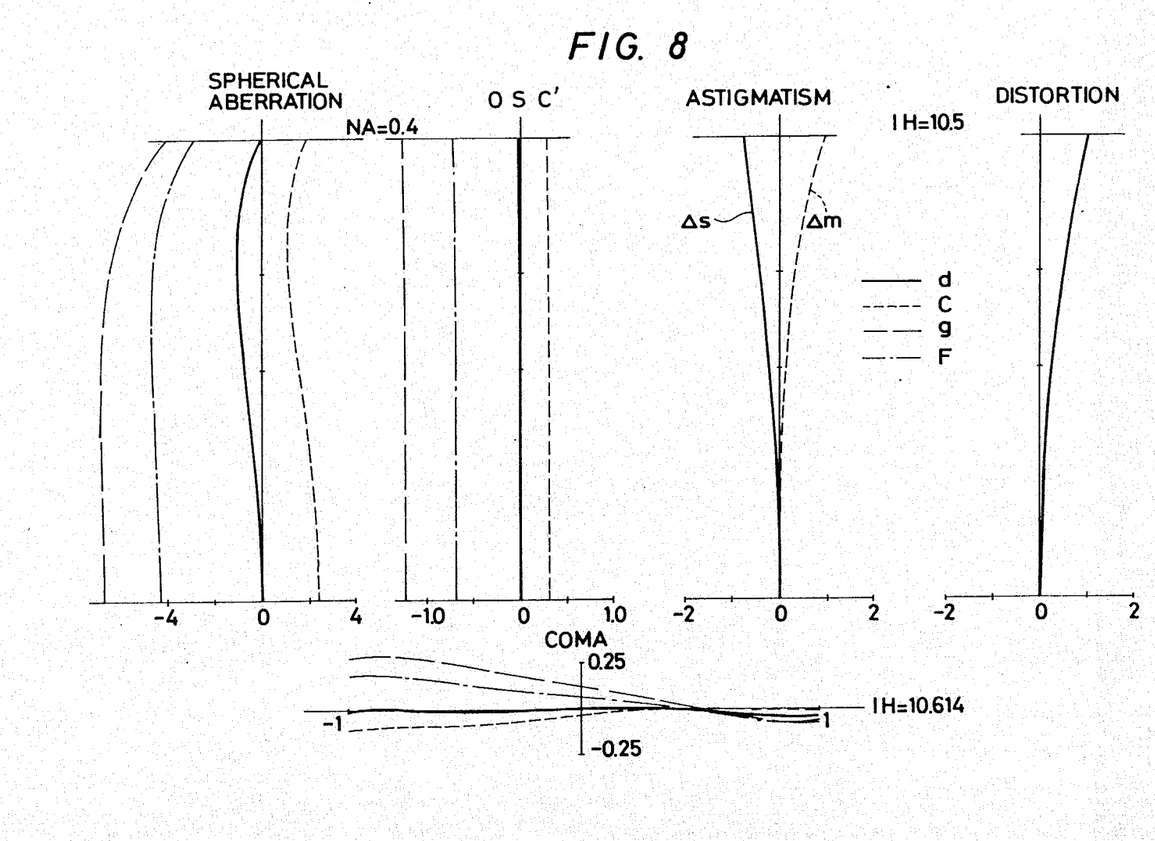
Figure 9:
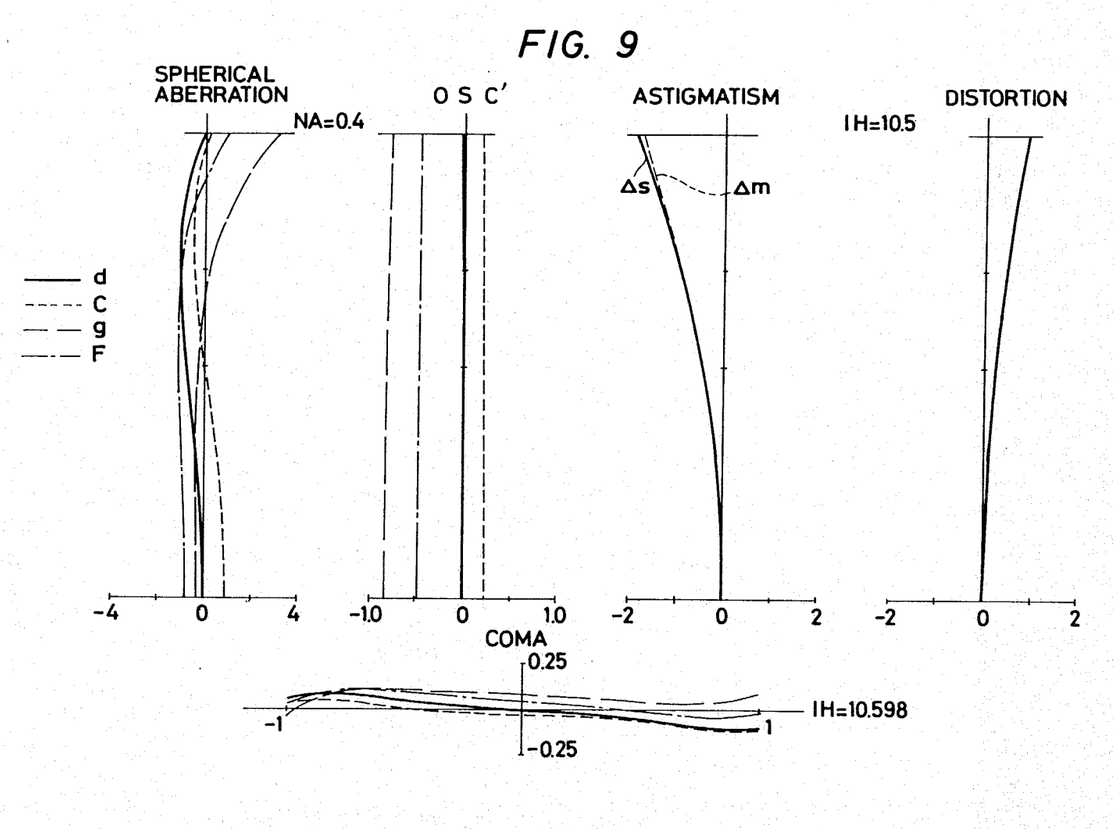
Figure 10:
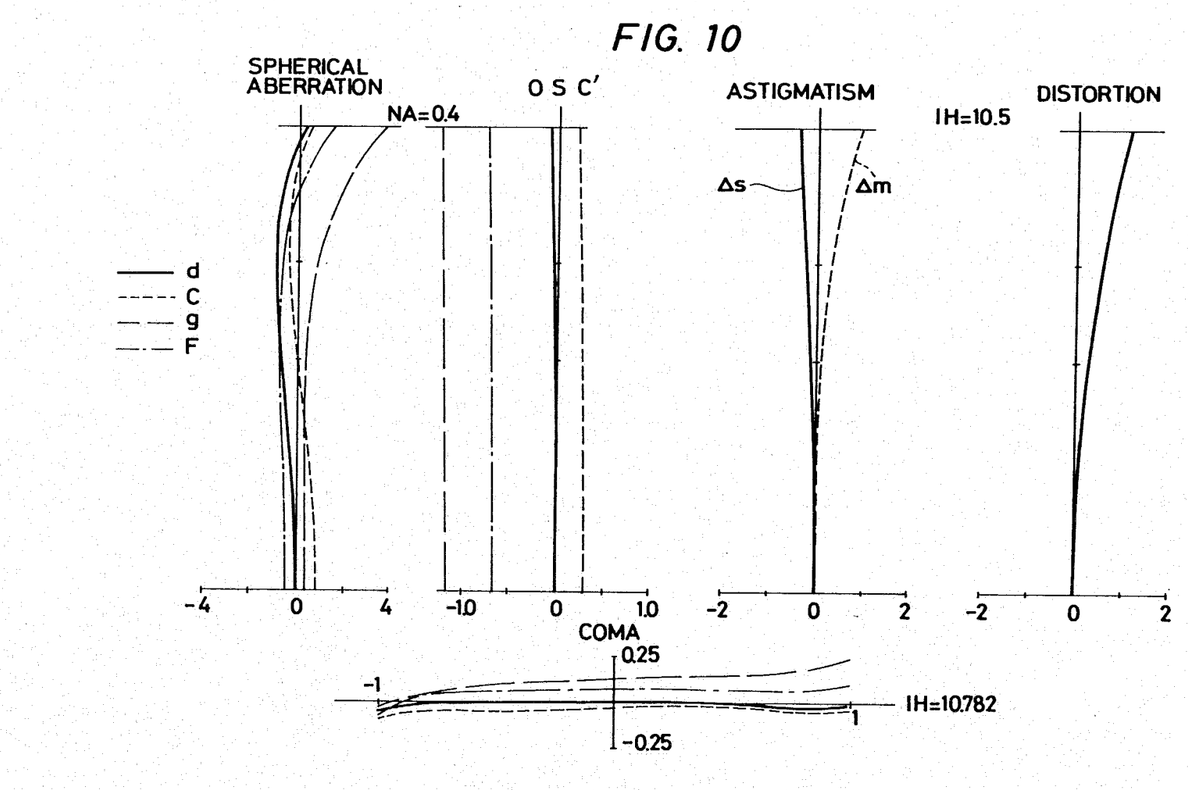

In the embodiments 5 through 8, the third lens component is a positive cemented doublet and the fourth lens component is a positive single-element component as illustrated in FIG. 2. Therefore, the reference symbol R corresponds to $r_8$, the reference symbols $N_n$ and $N_p$ corresponds to $n_4$ and $n_5$ respectively, the reference symbols $\nu_n$ and $\nu_p$ correspond to $\nu_4$ and $\nu_5$ respectively, and the reference symbol R' corresponds to $r_7$. In case of these embodiments, it is possible to obtain an especially excellent objective lens system by restricting the upper and lower limits of the conditions within the ranges defined by the following conditions (2''), (4'') and (6'') respectively:

$$0.4 < r_5/R < 1.1 \quad (2'')$$

$$30 < [(\nu_3 - \nu_2) + (\nu_p - \nu_n)] < 70 \quad (4'')$$

$$0.075 < |(N_n - N_p)/R'|f < 0.13 \quad (6'')$$

Further, the present invention has succeeded in enhancing transmittance of the entire lens system above 60% by using a glass material which shows, at a thickness of 10 mm, spectroscopic transmittance exceeding 80% including loss due to reflection at a wave length of 360 nm. Therefore, the lens system provided by the present invention is especially suited as an objective lens systems for fluorescence microscopes. The objective lens system for microscopes according to the present invention has a large NA and shows high performance with aberrations favorably corrected even at the marginal portion. Moreover, the objective lens system according to the present invention is usable with both fluorescence microscopes and ordinary type microscopes since transmittance of the glass material gives no influence on aberrations.

I claim:

1. An objective lens system for microscopes comprising a front lens group consisting of a first positive meniscus lens component and a second positive cemented doublet component, and a rear lens group consisting of a third lens component having positive refractive power and a fourth lens component having positive refractive power, and said lens system satisfying the following conditions:

$$0.5 < r_1/r_2 < 0.8 \quad (1)$$

$$0.3 < r_5/R < 1.1 \quad (2)$$

$$0.12f < d_1/n_1 < 0.19f \quad (3)$$

$$30 < [(\nu_2 - \nu_3) + (\nu_p - \nu_n)] < 120 \quad (4)$$

$$0.35 < f_1/f_2 < 0.65 \quad (5)$$

wherein the reference symbols $r_1$ and $r_2$ represents radii of curvature on both the surfaces of the first lens component, the reference symbol $r_5$ designates radius of curvature on the image side surface of the second lens component, the reference symbol R denotes radius of curvature on the image side surface of the third lens component, the reference symbol $d_1$ represents thickness of the first lens component, the reference symbol $n_1$ designates refractive index of the first lens component, the reference symbols $\nu_2$ and $\nu_3$ denote Abbe's numbers of both the elements respectively of the second lens component, the reference symbol $\nu_p$ and $\nu_n$ represent Abbe's numbers of the positive and negative lens elements respectively of the cemented doublet component arranged in the rear lens group, and the reference symbols $f_1$ and $f_2$ designate focal lengths of the front and rear lens groups respectively.

2. An objective lens system for microscopes according to claim 1 satisfying the following additional condition (6):

$$0.075 < \left|\frac{N_n - N_p}{R'}\right|f < 0.25 \quad (6)$$

wherein the reference symbols $N_n$ and $N_p$ represent refractive indices of the negative and positive lens elements respectively of said cemented doublet component arranged in said rear lens group and the reference symbol R' designates radius of curvature on the cemented surface of said cemented doublet component arranged in said rear lens group.

3. An objective lens system for microscopes according to claim 2 wherein said third lens component is a single-element lens component and said fourth lens component is a positive cemented doublet component.

4. An objective lens system for microscope according to claim 3 so adapted as to satisfy the following conditions (2'), (4') and (6'):

$$0.3 < r_5/R < 0.5 \quad (2')$$

$$70 < [(\nu_3 - \nu_2) + (\nu_p - \nu_n)] < 120 \quad (4')$$

$$0.13 < |(N_n - N_p)/R'|f < 0.25 \quad (6').$$

5. An objective lens system for microscopes according to claim 4 having the following numerical data:

| | | | |
|---|---|---|---|
| $r_1 = -0.2293$ | | | |
| $r_2 = -0.3664$ | $d_1 = 0.2399$ | $n_1 = 1.61659$ | $\nu_1 = 36.63$ |
| | $d_2 = 0.0051$ | | |
| $r_3 = 4.3251$ | | | |
| | $d_3 = 0.0436$ | $n_2 = 1.57957$ | $\nu_2 = 53.75$ |
| $r_4 = 0.5891$ | | | |
| | $d_4 = 0.1894$ | $n_3 = 1.43389$ | $\nu_3 = 95.15$ |
| $r_5 = -0.4488$ | | | |
| | $d_5 = 1.2629$ | | |
| $r_6 = -3.6847$ | | | |
| | $d_6 = 0.1768$ | $n_4 = 1.48749$ | $\nu_4 = 70.15$ |
| $r_7 = -1.0139$ | | | |
| | $d_7 = 0.0316$ | | |
| $r_8 = 2.3172$ | | | |
| | $d_8 = 0.1086$ | $n_5 = 1.61659$ | $\nu_5 = 36.63$ |
| $r_9 = 0.8443$ | | | |
| | $d_9 = 0.1894$ | $n_6 = 1.143389$ | $\nu_6 = 95.15$ |
| $r_{10} = -4.5056$ | | | |
| $f = 1$ | | NA = 0.4 | $\beta = -10X$ |
| $f_1 = 1.08$ | | $f_2 = 1.99$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol NA designates numerical aperture and the reference symbol $\beta$ denotes magnification.

6. An objective lens system for microscopes according to claim 4 having the following numerical data:

| | | | |
|---|---|---|---|
| $r_1 = -0.2459$ | | | |
| $r_2 = -0.3818$ | $d_1 = 0.2396$ | $n_1 = 1.61659$ | $\nu_1 = 36.63$ |
| | $d_2 = 0.0050$ | | |

-continued

| | | | |
|---|---|---|---|
| $r_3 = 4.4832$ | | | |
| | $d_3 = 0.0435$ | $n_2 = 1.57957$ | $v_2 = 53.75$ |
| $r_4 = 0.5852$ | | | |
| | $d_4 = 0.2144$ | $n_3 = 1.43389$ | $v_3 = 95.15$ |
| $r_5 = -0.4491$ | | | |
| | $d_5 = 1.2610$ | | |
| $r_6 = -4.9133$ | | | |
| | $d_6 = 0.1765$ | $n_4 = 1.48749$ | $v_4 = 70.15$ |
| $r_7 = -1.0536$ | | | |
| | $d_7 = 0.0315$ | | |
| $r_8 = 2.2089$ | | | |
| | $d_8 = 0.1084$ | $n_5 = 1.61659$ | $v_5 = 36.63$ |
| $r_9 = 0.8289$ | | | |
| | $d_9 = 0.1892$ | $n_6 = 1.43389$ | $v_6 = 95.15$ |
| $r_{10} = -6.2556$ | | | |
| | $f = 1$ | $NA = 0.4$ | $\beta = -10X$ |
| | $f_1 = 1.07$ | $f_2 = 2.00$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $v_1$ through $v_5$ represent Abbe's numbers of the respective lens elements, the reference symbol NA designates numerical aperture and the reference symbol $\beta$ denotes magnification.

7. An objective lens system for microscopes according to claim 4 having the following numerical data:

| | | | |
|---|---|---|---|
| $r_1 = -0.2168$ | | | |
| | $d_1 = 0.2333$ | $n_1 = 1.61659$ | $v_1 = 36.63$ |
| $r_2 = -0.3313$ | | | |
| | $d_2 = 0.0048$ | | |
| $r_3 = 5.2569$ | | | |
| | $d_3 = 0.0418$ | $n_2 = 1.57957$ | $v_2 = 53.75$ |
| $r_4 = 0.5343$ | | | |
| | $d_4 = 0.1818$ | $n_3 = 1.43389$ | $v_3 = 95.15$ |
| $r_5 = -0.3793$ | | | |
| | $d_5 = 1.5147$ | | |
| $r_6 = -49.8194$ | | | |
| | $d_6 = 0.1696$ | $n_4 = 1.48749$ | $v_4 = 70.15$ |
| $r_7 = -1.1560$ | | | |
| | $d_7 = 0.0303$ | | |
| $r_8 = 2.5250$ | | | |
| | $d_8 = 0.1042$ | $n_5 = 1.61659$ | $v_5 = 36.63$ |
| $r_9 = 0.7026$ | | | |
| | $d_9 = 0.1818$ | $n_6 = 1.48749$ | $v_6 = 70.15$ |
| $r_{10} = 25.0452$ | | | |
| | $f = 1$ | $NA = 0.4$ | $\beta = -10X$ |
| | $f_1 = 0.811$ | $f_2 = 2.16$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $v_1$ through $v_5$ represent Abbe's numbers of the respective lens elements, the reference symbol NA designates numerical aperture and the reference symbol $\beta$ denotes magnification.

8. An objective lens system for microscopes according to claim 4 having the following numerical data:

| | | | |
|---|---|---|---|
| $r_1 = -0.2095$ | | | |
| | $d_1 = 0.2372$ | $n_1 = 1.61659$ | $v_1 = 36.63$ |
| $r_2 = -0.3158$ | | | |
| | $d_2 = 0.0050$ | | |
| $r_3 = 5.0101$ | | | |
| | $d_3 = 0.0431$ | $n_2 = 1.61659$ | $v_2 = 36.63$ |
| $r_4 = 0.7297$ | | | |
| | $d_4 = 0.2122$ | $n_3 = 1.43389$ | $v_3 = 95.15$ |
| $r_5 = -0.4680$ | | | |
| | $d_5 = 1.2482$ | | |
| $r_6 = -3.3554$ | | | |
| | $d_6 = 0.1747$ | $n_4 = 1.48749$ | $v_4 = 70.15$ |
| $r_7 = -1.1513$ | | | |
| | $d_7 = 0.0312$ | | |
| $r_8 = 7.9857$ | | | |
| | $d_8 = 0.1073$ | $n_5 = 1.58921$ | $v_5 = 41.08$ |
| $r_9 = 1.0061$ | | | |
| | $d_9 = 0.1872$ | $n_6 = 1.43389$ | $v_6 = 95.15$ |
| $r_{10} = -1.5490$ | | | |
| | $f = 1$ | $NA = 0.4$ | $\beta = -10X$ |
| | $f_1 = 0.96$ | $f_2 = 2.10$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $v_1$ through $v_5$ represent Abbe's numbers of the respective lens elements, the reference symbol NA designates numerical aperture and the reference symbol $\beta$ denotes magnification.

9. An objective lens system for microscopes according to claim 2 wherein said third lens component is a positive cemented doublet component and said fourth lens component is a positive single-element lens component.

10. An objective lens system according to claim 9 so adapted as to satisfy the following conditions (2″), (4″) and (6″):

$$0.4 < r_5/R < 1.1 \tag{2″}$$

$$30 < [(v_3 - v_2) + (v_p - v_n)] < 70 \tag{4″}$$

$$0.075 < |(N_n - N_p)/R'|f < 0.13 \tag{6″}$$

11. An objective lens system for microscopes according to claim 10 having the following numerical data:

| | | | |
|---|---|---|---|
| $r_1 = -0.2065$ | | | |
| | $d_1 = 0.2551$ | $n_1 = 1.61659$ | $v_1 = 36.63$ |
| $r_2 = -0.3465$ | | | |
| | $d_2 = 0.0050$ | | |
| $r_3 = -5.6243$ | | | |
| | $d_3 = 0.0429$ | $n_2 = 1.61659$ | $v_2 = 36.63$ |
| $r_4 = 0.3834$ | | | |
| | $d_4 = 0.2115$ | $n_3 = 1.61117$ | $v_3 = 55.92$ |
| $r_5 = -0.5668$ | | | |
| | $d_5 = 1.2442$ | | |
| $r_6 = -2.1238$ | | | |
| | $d_6 = 0.1070$ | $n_4 = 1.61659$ | $v_4 = 36.63$ |
| $r_7 = 1.4540$ | | | |
| | $d_7 = 0.1860$ | $n_5 = 1.48749$ | $v_5 = 70.15$ |
| $r_8 = -1.0154$ | | | |
| | $d_8 = 0.0305$ | | |
| $r_9 = 4.9207$ | | | |
| | $d_9 = 0.1742$ | $n_6 = 1.48749$ | $v_6 = 70.15$ |
| $r_{10} = -2.2830$ | | | |
| | $f = 1$ | $NA = 0.4$ | $\beta = -10X$ |
| | $f_1 = 0.884$ | $f_2 = 2.18$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $v_1$ through $v_5$ represent Abbe's numbers of the respective lens elements, the reference symbol NA designates numerical aperture and the reference symbol $\beta$ denotes magnification.

12. An objective lens system for microscopes according to claim 10 having the following numerical data:

| | | | |
|---|---|---|---|
| $r_1 = -0.2179$ | | | |
| | $d_1 = 0.2515$ | $n_1 = 1.51633$ | $\nu_1 = 64.15$ |
| $r_2 = -0.3026$ | | | |
| | $d_2 = 0.0062$ | | |
| $r_3 = 3.1358$ | | | |
| | $d_3 = 0.0418$ | $n_2 = 1.71700$ | $\nu_2 = 47.94$ |
| $r_4 = 0.8726$ | | | |
| | $d_4 = 0.1107$ | $n_3 = 1.61720$ | $\nu_3 = 54.04$ |
| $r_5 = -0.9623$ | | | |
| | $d_5 = 1.1266$ | | |
| $r_6 = -3.3947$ | | | |
| | $d_6 = 0.1052$ | $n_4 = 1.64769$ | $\nu_4 = 33.80$ |
| $r_7 = 1.5258$ | | | |
| | $d_7 = 0.1365$ | $n_5 = 1.49831$ | $\nu_5 = 65.03$ |
| $r_8 = -0.9225$ | | | |
| | $d_8 = 0.0307$ | | |
| $r_9 = 3.6194$ | | | |
| | $d_9 = 0.2460$ | $n_6 = 1.58528$ | $\nu_6 = 50.87$ |
| $r_{10} = -4.4582$ | | | |
| | $f = 1$ | $NA = 0.4$ | $\beta = -10X$ |
| | $f_1 = 0.95$ | $f_2 = 1.77$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol NA designates numerical aperture and the reference symbol $\beta$ denotes magnification.

13. An objective lens system for microscopes according to claim 10 having the following numerical data:

| | | | |
|---|---|---|---|
| $r_1 = -0.2689$ | | | |
| | $d_1 = 0.2473$ | $n_1 = 1.61659$ | $\nu_1 = 36.63$ |
| $r_2 = -0.4551$ | | | |
| | $d_2 = 0.0060$ | | |
| $r_3 = 3.2970$ | | | |
| | $d_3 = 0.0423$ | $n_2 = 1.61659$ | $\nu_2 = 36.63$ |
| $r_4 = 0.5488$ | | | |
| | $d_4 = 0.1149$ | $n_3 = 1.55963$ | $\nu_3 = 61.14$ |
| $r_5 = -0.5173$ | | | |
| | $d_5 = 1.1075$ | | |
| $r_6 = -2.4841$ | | | |
| | $d_6 = 0.1034$ | $n_4 = 1.61659$ | $\nu_4 = 36.63$ |
| $r_7 = 1.2691$ | | | |

-continued

| | | | |
|---|---|---|---|
| | $d_7 = 0.1632$ | $n_5 = 1.48749$ | $\nu_5 = 70.15$ |
| $r_8 = -1.0786$ | | | |
| | $d_8 = 0.0302$ | | |
| $r_9 = 2.8706$ | | | |
| | $d_9 = 0.1693$ | $n_6 = 1.51728$ | $\nu_6 = 69.56$ |
| $r_{10} = -2.2526$ | | | |
| | $f = 1$ | $NA = 0.4$ | $\beta = -10X$ |
| | $f_1 = 0.88$ | $f_2 = 1.84$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol NA designates numerical aperture and the reference symbol $\beta$ denotes magnification.

14. An objective lens system for microscopes according to claim 10 having the following numerical data:

| | | | |
|---|---|---|---|
| $r_1 = -0.1962$ | | | |
| | $d_1 = 0.2510$ | $n_1 = 1.56873$ | $\nu_1 = 63.16$ |
| $r_2 = -0.3065$ | | | |
| | $d_2 = 0.0061$ | | |
| $r_3 = 1.8758$ | | | |
| | $d_3 = 0.0417$ | $n_2 = 1.71700$ | $\nu_2 = 47.94$ |
| $r_4 = 0.6175$ | | | |
| | $d_4 = 0.1105$ | $n_3 = 1.61342$ | $\nu_3 = 57.41$ |
| $r_5 = -0.9062$ | | | |
| | $d_5 = 1.1243$ | | |
| $r_6 = -2.4746$ | | | |
| | $d_6 = 0.1049$ | $n_4 = 1.64769$ | $\nu_4 = 33.80$ |
| $r_7 = 1.3788$ | | | |
| | $d_7 = 0.1362$ | $n_5 = 1.48749$ | $\nu_5 = 70.15$ |
| $r_8 = -1.1274$ | | | |
| | $d_8 = 0.0307$ | | |
| $r_9 = 5.4990$ | | | |
| | $d_9 = 0.2455$ | $n_6 = 1.51728$ | $\nu_6 = 69.56$ |
| $r_{10} = -1.4729$ | | | |
| | $f = 1$ | $NA = 0.4$ | $\beta = -10X$ |
| | $f_1 = 0.90$ | $f_2 = 1.88$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_5$ denote refractive indices of the respective lens elements, the reference symbols $\nu_1$ through $\nu_5$ represent Abbe's numbers of the respective lens elements, the reference symbol NA designates numerical aperture and the reference symbol denotes magnification.

* * * * *